June 4, 1940.  S. L. EGENAS  2,202,987

AERIAL NAVIGATION

Filed Dec. 9, 1937

Inventor:
Severin L. Egenas,

Patented June 4, 1940

2,202,987

UNITED STATES PATENT OFFICE 2,202,987

AERIAL NAVIGATION

Severin L. Egenas, Chicago, Ill., assignor to Hermann Hille, Chicago, Ill.

Application December 9, 1937, Serial No. 178,949

1 Claim. (Cl. 73—151)

This invention relates to improvements in method and apparatus for the navigation of aircraft, and particularly to a method and apparatus for the determination of wind direction and velocity from aircraft while in flight.

The main objects of this invention are to provide an improved method for determining absolute wind direction and velocity from aircraft in flight; to provide an improved method for determining the necessary compensation for lateral drift of aircraft while navigating a predetermined course; to provide an improved method of navigating aircraft; to provide an improved apparatus for determining wind direction and velocity from aircraft while in flight; to provide such apparatus to enable the maintenance of a substantially constant ground speed while determining wind direction and velocity; to provide such apparatus arranged to indicate variations in ground speed or momentum; and to provide such apparatus arranged to indicate changes in momentum or ground speed while variations in air speed are being observed.

A specific embodiment of this invention is shown in the accompanying drawing, in which.

Knowledge of the absolute wind direction and velocity is of great importance from the standpoint of safety, particularly in blind flying, since it enables a pilot to determine his drift and to thereby stay in his predetermined course. Heretofore in the navigation of aircraft, it has been impossible for the pilot or navigator to determine wind direction and velocity, over the course that it is desired to follow, from the aircraft while it is in blind flight; and it has been estimated that approximately half the transport accidents could have been obviated were these factors known.

My improved method of aircraft navigation is intended to overcome this difficulty and involves a series of relatively simple procedural steps whereby wind direction and velocity can be quickly and substantially accurately determined from an aircraft while it is in flight without taking the ship far from its predetermined course and whereby the ship will be substantially on its predetermined course at the termination of the necessary observations.

In the practice of my improved method of navigation, and while in full flight, the aircraft is navigated through a 360° horizontal turn, or such turn as may be necessary, while it is maintained at a substantially constant speed relative to the ground and during such turn observations are made of the air speed as indicated by suitable apparatus for that purpose, the maximum and minimum air speed attained being noted, together with the direction in which the aircraft is flying at the time of each such maximum and minimum air speed indications.

Thus, after the maximum and minimum air speeds are determined and the direction of flight at the maximum and minimum points is had, the wind direction and velocity may be determined by finding half the difference between the maximum and minimum air speeds, which is substantially the actual or absolute wind velocity, and by noting the direction in which the aircraft is flying at the point of minimum air speed, which is the actual or absolute wind direction.

An essential factor in the practice of my invention is the maintenance of a substantially constant ground speed during the time that the maximum and minimum air-speed observations are being made and for this purpose means are provided to automatically indicate any change in momentum, or inertia, of the aircraft, thus indicating to the pilot whether he is gaining or losing speed relative to the established speed at which the aircraft is desired to be kept moving during the period of observation, so that proper compensation can be made to negative or overcome any observed speed change. Such compensation may be accomplished by increasing or decreasing the speed of the motor or motors driving the aircraft, or by diving or climbing to increase or decrease the speed of the aircraft respectively, so that the desired ground speed will be maintained.

Figure 1:
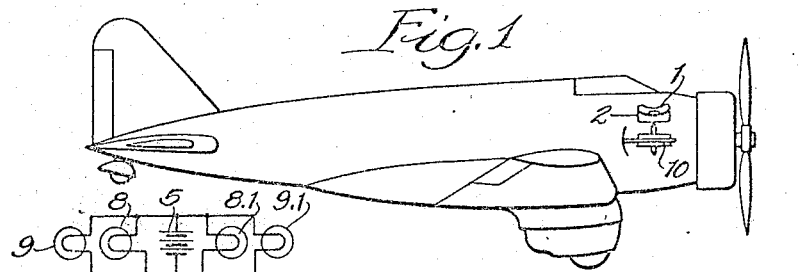
Fig. 1 is a view of an aircraft illustrating diagrammatically the manner in which the improved apparatus may be positioned within the aircraft.
Figure 2:
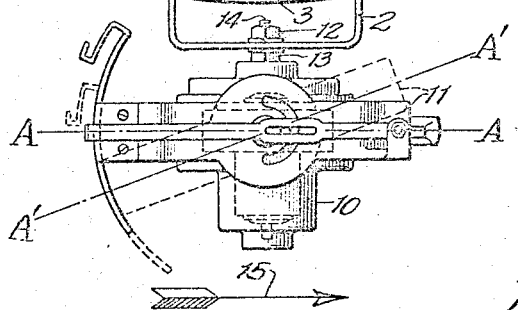
Fig. 2 is a view in vertical elevation showing apparatus for indicating a change in momentum or ground speed.

A change of momentum indicating device suitable for this purpose is illustrated in Fig. 2 of the drawing, and as shown comprises indicating means sensitive to changes or variations in momentum or inertia combined with a constant level device arranged to keep the inertia change indicator level with respect to the earth irrespective of changes in the flight attitude of the aircraft in which the device is mounted.

As shown, the inertia change indicator comprises an elongated tube 1 curved upwardly from its middle toward its ends, and supported at its ends in a U-shaped bracket 2. A ball of mercury 3 is contained in the tube 1 and the tube is disposed so that its central portion will be lowermost with the mercury normally lying therein. Also a plurality of contacts are disposed in the upwardly curved portions of the tube 1 on each side of the tube center, which contacts are provided with suitable electrical connections and arranged to complete respective electrical circuits when engaged by the mercury 3.

In the form shown there are three longitudinally-spaced contacts provided on each side of the tube center, the central contacts 4 and 4.1 of each group respectively, being connected to a common source of electromotive force, such as a battery 5 and the outside contacts, 6, 6.1, 7 and 7.1 being each connected to one side of a respective light source or other indicating means 8, 8.1, 9 and 9.1, from which suitable connections are made to the opposite side of the battery 5. In the arrangement shown, the indicating means 8 and 9 show acceleration and 8.1 and 9.1 show deceleration.

Thus, when the tube 1 is maintained in a constantly level position with respect to the earth, any change in momentum or inertia of the device will cause the ball of mercury 3 to shift backward or forward according to the direction in which the change is taking place. Such shifting of the ball of mercury 3 will cause it to engage either the contacts 4, 6, and 7, or the contacts 4.1, 6.1, and 7.1, so as to complete a circuit between the central contact and either one or both the outside contacts, thereby energizing the respective light sources or other indicating means to produce a visual indication of the momentum or inertia change and the direction in which the change is taking place.

A slight change of momentum will cause the mercury to contact with only the two innermost contacts on the side toward which the mercury moves, for example the contacts 4 and 6, thus energizing the light source 8 only. A greater amount of inertia or momentum change in the same direction will cause the mercury to move so far as to engage all three contacts 6, 4, and 7, thus energizing both the light sources 8 and 9, and a still greater change of momentum will cause the mercury to shift so far as to engage only the central contact 4 and the outermost contact 7, thereby energizing the light source 9 alone. In this manner a visual indication of the approximate extent of momentum or inertia change is had.

The means for maintaining the momentum change indicating device in a constantly level position may be any suitable constant-level mechanism, such for example, as a gyroscope which has the characteristic of maintaining fixed position in space when it is rotating at a high speed, otherwise referred to as rigidity in space.

The particular gyroscope device illustrated is the well-known gyro-horizon instrument, manufactured by the Sperry Gyroscope Company, Inc., which comprises an encased gyroscope 10 universally suspended in suitable gimbals so that it may maintain a fixed position relative to the earth, regardless of the flight attitude of the aircraft in which it is mounted. The gyro-horizon instrument is positioned within the aircraft with the axis of the outermost gimbal 11 disposed in a position parallel with the longitudinal center line of the aircraft and the encased gyroscope 10 is disposed with the axis of rotation of the gyroscope in a vertical position. Thus the aircraft may change its flight attitude with respect to the vertical axis of the gyroscope without affecting its constant level position, as indicated by the dotted lines of Fig. 2, which show the relative position of the gyroscope 10 and the outermost gimbal 11 when the aircraft is in a climb. The longitudinal axis A—A of the outer gimbal 11, however, will always remain parallel with the fore and aft axis of the aircraft and the gyroscope casing 10 will turn therewith in any horizontal direction.

As shown, the momentum change indicator is fixedly mounted on the upper portion of the gyroscope casing 10, the bracket 2 of the momentum change indicator being clamped between two nuts 12 and 13 threaded on a stud 14 which is integral with the gyroscope casing 10. The bracket 2 is mounted on the gyroscope casing so that its longitudinal axis and the axis of the indicator tube 1 will lie in the same vertical plane as the axis A—A of the outer gimbal 11.

Thus, regardless of the flight attitude of the aircraft in which the device is mounted, the momentum change indicator will be held constantly in a vertical position with its axis at all times extending in the fore and aft direction of the aircraft.

Figure 3:
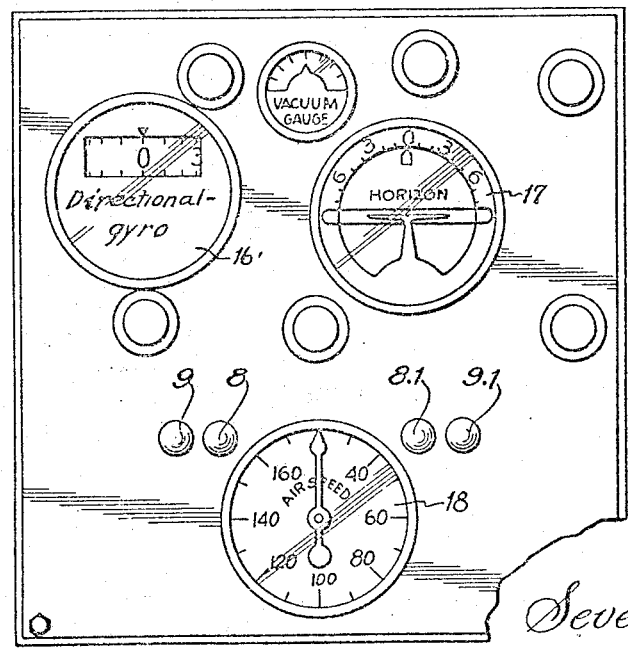
Fig. 3 is a face view of a control panel embodying the instruments for carrying out the improved method of navigation, and, Fig. 4 is a course diagram illustrating the manner in which the improved method of navigation is accomplished.

From the foregoing it will be seen that the devices necessary to make the observation for determining the wind velocity and wind direction are the change of momentum indicator, together with the constant level device, an air speed indicator and a compass. These devices may be combined in a panel, as shown in Fig. 3. Since a directional gyro such as manufactured by the Sperry Gyroscope Company, Inc., is a preferable instrument for indicating the direction of flight, the particular panel illustrated comprises a directional-gyro 16, a gyro-horizon 17 on which the momentum change indicating device is mounted, an air speed indicator 18 and the means 8, 8.1, 9 and 9.1 for providing visual indication of inertia or momentum change.

The air speed indicator 18 may be any suitable device for that purpose, such for example, as the air speed indicator manufactured by the Pioneer Instrument Company, Incorporated.

In operation of the momentum change indicator, any variation of the aircraft's inertia or momentum, which would occur during a variation of the ground speed of the aircraft, will cause the mercury 3 contained in the momentum change indicator tube 1 to shift along the curved bottom surface of the tube in the direction opposite that at which the momentum or inertia change takes place, causing a circuit to be completed between the contacts located in the respective end of the tube 1, so as to energize the respective visual indication means.

For example, should there be an increase in ground speed, or an acceleration of the aircraft, which is flying in the direction of the arrow 15 shown in Fig. 2, the mercury 3, due to its own inertia, will be caused to shift toward the contacts 6, 4 and 7, engaging first the contacts 6 and 4 to complete a circuit to the indicating means 8, or if the rate of acceleration is high enough the mercury will engage the contacts 6, 4 and 7 to energize both the indicating means 8 and 9, or upon a still greater ground speed or momentum change in the direction of acceleration the mercury 3 will be caused to move so far as to engage only the contacts 4 and 7, so that only the indicating means 9 will be energized. In the case of deceleration, the mercury will shift to the opposite side of the tube 1 and engage the contacts 6.1, 4.1, and 7.1 in the same manner as in the case of acceleration, so that the indicating means 8.1 and 9.1 will be energized.

Thus, to keep the plane at a substantially constant ground speed the pilot, by observing the indicating means 8, 9, 8.1 and 9.1, will be instantly advised of any change of momentum and the direction in which such change is taking place, and need only climb or dive or decrease or increase the speed of his motors in order to compensate for or overcome the observed momentum change. For example, should the indicating means 8 and 9 become energized to indicate acceleration, or increase of ground speed, the pilot need only decrease the speed of his motors or climb to decrease the speed of the aircraft, and thus compensate for the undesired acceleration. The amount of compensation required is determined by whether indicating means 8 alone is energized to indicate a small or moderate momentum change, or whether 8 and 9 are energized, which indicates a somewhat greater momentum change, or whether the indicator 9 alone is energized, which indicates a relatively large momentum change.

As shown, the indicating means 8 and 9, or 8.1 and 9.1 are grouped on respective sides of the air speed indicator, so that the pilot may observe both the momentum change indications and the air speed, and in order to more readily determine whether the momentum change is in the direction of acceleration or deceleration the respective indicating means can be provided with different characteristics; for example, if lights are used as shown, those for acceleration may be colored green and those for deceleration colored red.

Figure 4:
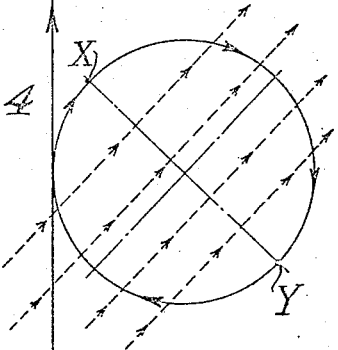

Thus, in the practice of my improved method of determining wind direction and velocity, the aircraft need only be flown through a 360° horizontal turn, as shown by the heavy lines and arrows in Fig. 4, meanwhile being maintained at a substantially constant ground speed or momentum. As the aircraft is navigated through the horizontal turn the air speed indicator is observed, and the maximum and minimum air speeds attained are noted, together with the direction in which the aircraft is flying for the condition of maximum or minimum air speed, after which the airship can be returned to its normal course. The wind velocity will then be determined by obtaining one-half the difference between the maximum and minimum air speeds and the direction toward which the wind is blowing will be the direction in which the ship was flying at the point of minimum air speed. At the point of maximum air speed, the ship will be flying directly into the wind and the direction of flight will be the direction from which the wind is blowing.

The reason for this is that since the air speed indicator indicates the speed of the airship relative to the air in which it is flying, the point of minimum air speed will be attained when the ship is flying in the direction in which the wind is moving, and the point of maximum air speed will be attained when the aircraft is flying directly into the wind. Thus, with a constant ground speed the minimum air speed attained will be the actual ground speed less the wind velocity, and the maximum air speed will be the actual ground speed plus the wind velocity. Therefore, with a constant ground speed during the period of observation, the actual wind velocity will be one-half the difference between the maximum and minimum air speed indications, and the actual ground speed need not be known, so long as it is kept constant.

As an example, assuming that aircraft is navigated along the course of the heavy lines and arrows of the diagram shown in Fig. 4 and the wind direction is indicated by the broken lines and arrows, the point of minimum air speed will be the point X and the point of maximum air speed will be the point Y. Thus, if the air speed reading at the point X is 115 M. P. H. and the air speed reading at the point Y is 205 M. P. H., the actual wind velocity will be one-half the difference between 205 and 115, or 45 M. P. H., the wind direction being noted by the compass reading of the direction in which the airship is flying at the point X.

Although but one specific embodiment and practice of this invention is herein shown and described, it will be understood that details of the construction and practice set forth may be altered or omitted without departing from the spirit of this invention as defined by the following claim.

I claim:

A process of determining wind direction and velocity from an aircraft in flight, maneuvering said aircraft through a horizontal turn of substantially 360°, maintaining said aircraft at a substantially constant ground speed during said turn by observing changes in said ground speed and compensating therefor by correctional ground speed variations, and determining the maximum and minimum air speeds of said aircraft and the respective directions of flight during said turn.

SEVERIN L. EGENAS.